US011509787B2

(12) United States Patent
Horiguchi

(10) Patent No.: US 11,509,787 B2
(45) Date of Patent: Nov. 22, 2022

(54) IMAGE READING DEVICE AND IMAGE FORMING SYSTEM

(71) Applicant: KYOCERA Document Solutions Inc., Osaka (JP)

(72) Inventor: Yasuyuki Horiguchi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/543,037

(22) Filed: Dec. 6, 2021

(65) Prior Publication Data

US 2022/0182503 A1 Jun. 9, 2022

(30) Foreign Application Priority Data

Dec. 4, 2020 (JP) .............................. JP2020-201760

(51) Int. Cl.
*H04N 1/00* (2006.01)
*H04N 1/12* (2006.01)
*H04N 1/193* (2006.01)

(52) U.S. Cl.
CPC ..... *H04N 1/00761* (2013.01); *H04N 1/00013* (2013.01); *H04N 1/125* (2013.01); *H04N 1/193* (2013.01)

(58) Field of Classification Search
None
See application file for complete search history.

(56) References Cited

U.S. PATENT DOCUMENTS

| 9,444,966 | B2 * | 9/2016 | Fukawa | H04N 1/00071 |
| 2006/0250661 | A1 * | 11/2006 | Susaki | H04N 1/401 358/461 |
| 2017/0078527 | A1 * | 3/2017 | Fusayasu | H04N 1/00018 |
| 2018/0270385 | A1 * | 9/2018 | Zheng | H04N 1/00997 |
| 2020/0109768 | A1 * | 4/2020 | Sakurai | F16H 57/031 |

FOREIGN PATENT DOCUMENTS

JP 2001-005119 A 1/2001

* cited by examiner

*Primary Examiner* — Gabriel I Garcia
(74) *Attorney, Agent, or Firm* — Studebaker & Brackett PC

(57) ABSTRACT

Then image reading device includes a transparent document table, a frame, a reading unit, a moving mechanism, a white reference member, and a controller. The frame is provided around a peripheral of the document table. The white reference member is provided on the frame adjacent to the document table in the sub scanning direction and has a length in the main scanning direction longer than the document table. The reading unit includes a first reading part which reads an area corresponding to the document table and a second reading part which reads an area corresponding to the frame. The controller detects a boundary between the frame and the reference member based on a read value of the second reading part while moving the reading unit by the moving mechanism, and positions the reading unit at a home position apart from the boundary by a predetermined distance.

8 Claims, 9 Drawing Sheets

IMAGE READING DEVICE AND IMAGE FORMING SYSTEM

INCORPORATION BY REFERENCE

This application is based on and claims the benefit of priority from Japanese patent application No. 2020-201760 filed on Dec. 4, 2020, which is incorporated by reference in its entirety.

BACKGROUND

The present disclosure relates to an image reading device and an image forming system.

The image reading device includes a reading unit which irradiates light on a document and introduces the reflected light from the document to a photoelectric conversion element. The image forming device further includes a mechanism to move the reading unit in the predetermined direction in order to read the document placed on a document table. In the reading unit, a home position is defined, and when a reading job is input, the image reading device reads a white reference member while moving the reading unit from the home position as a start point to acquire white reference data, and then reads the document. Then, a mechanism for positioning the reading unit at the home position is required.

As a method for positioning the reading unit, a configuration for detecting the reading unit at the predetermined position by using a sensor such as a photo interrupter is considered. However, in this configuration, there is a problem that the size of the device is increased and the cost is increased. Therefore, a technique for positioning the reading unit by reading a mark indicating the home position with the reading unit is discussed.

However, it is conceivable that the reading unit stops at a position other than the home position due to voltage drop of the power supply or the like during execution of the reading job. In this case, if the mark indicating the home position has a simple shape, it is difficult to distinguish it from the document placed on the document table. To avoid this, it is conceivable that the mark is made complicated, but there is a problem that the algorithm of the processing for detecting the mark is complicated and a lot of time is needed for the detection.

SUMMARY

In accordance with an aspect of the present disclosure, an image reading device includes a transparent document table, a frame, a reading unit, a moving mechanism, a white reference member, and a controller. On the transparent document table, a document is placed. The frame is provided around a peripheral of the document table. The reading unit reads the document in a main scanning direction. The moving mechanism moves the reading unit in a sub scanning direction crossing to the main scanning direction. The white reference member is provided on the frame adjacent to the document table in the sub scanning direction and has a length in the main scanning direction longer than the document table. The controller controls the moving mechanism. The reading unit includes a first reading part which reads an area corresponding to the document table and a second reading part which reads an area corresponding to the frame. The controller detects a boundary between the frame and the reference member based on a read value of the second reading part while moving the reading unit by the moving mechanism, and positions the reading unit at a home position apart from the boundary by a predetermined distance.

In accordance with an aspect of the present disclosure, an image forming system includes the image reading device and an image forming apparatus which forms an image of the document read by the image reading device on a sheet.

The other features and advantages of the present disclosure will become more apparent from the following description. In the detailed description, reference is made to the accompanying drawings, and preferred embodiments of the present disclosure are shown by way of example in the accompanying drawings.

DETAILED DESCRIPTION

Hereinafter, with reference to the attached drawings, a multifunctional peripheral 100 (an example of an image forming system) according to one embodiment of the present disclosure will be described. The multifunctional peripheral 100 includes a printer 1 (an example of an image forming apparatus) and a scanner 110 (an example of an image reading device).

Figure 1:
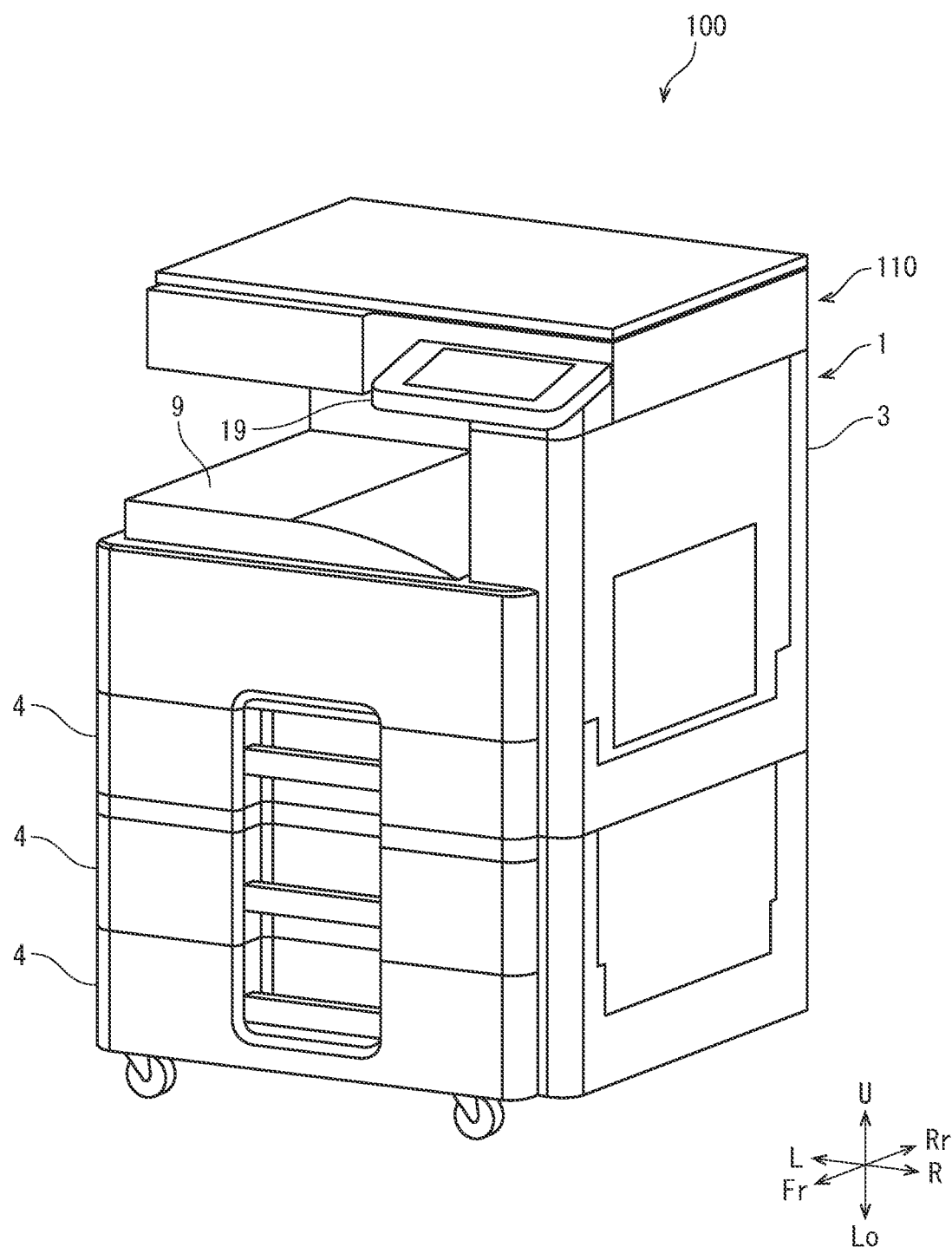
FIG. 1 is a perspective view showing an external appearance of a multifunctional peripheral according to one embodiment of the present disclosure.
Figure 2:
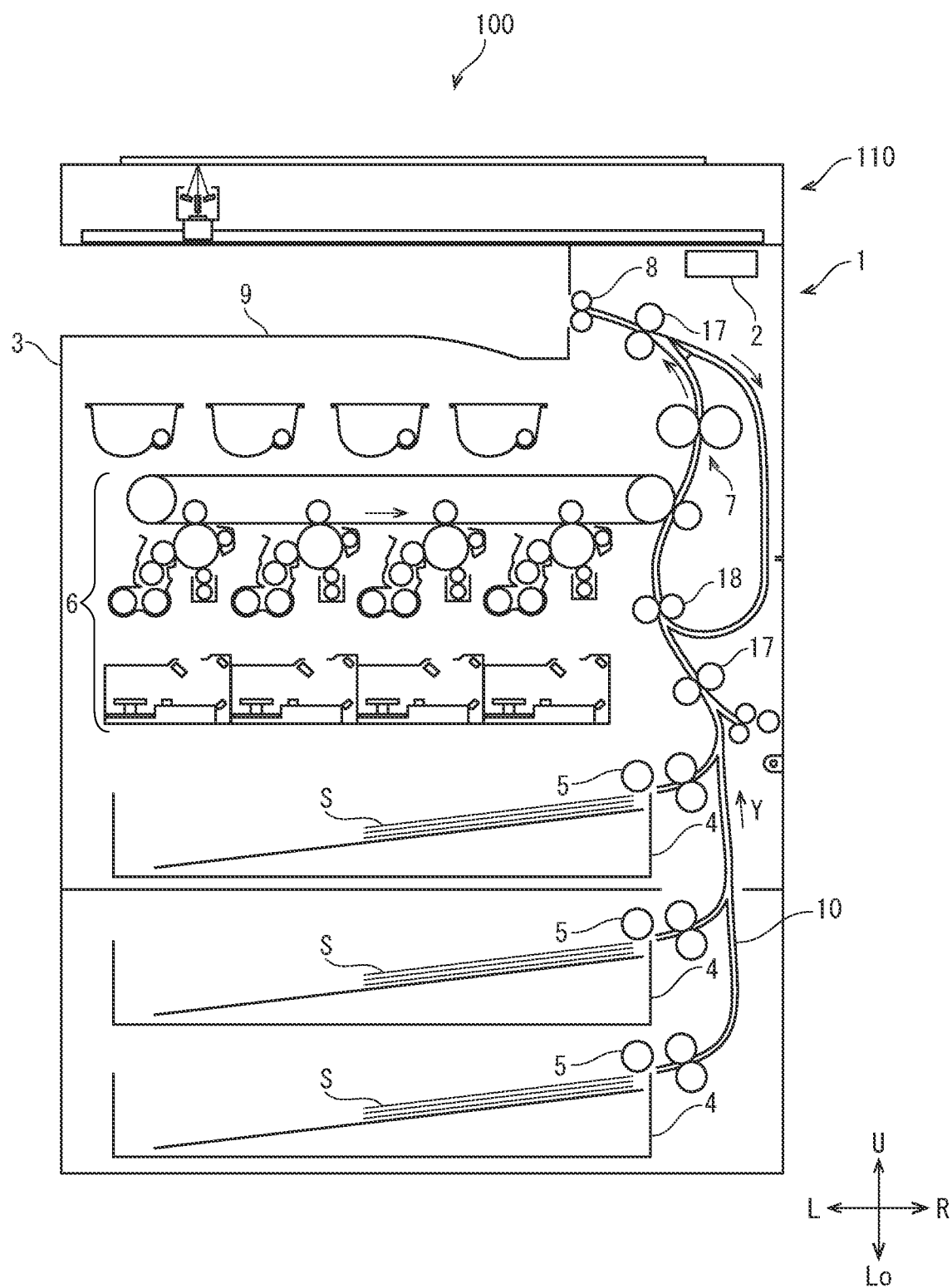
FIG. 2 is a perspective view schematically showing an inner structure of the multifunctional peripheral according to the embodiment of the present disclosure.

First, an outline of a structure of the printer 1 will be described. FIG. 1 is a perspective view showing an external appearance of the multifunctional peripheral 100. FIG. 2 is a front view schematically showing an internal structure of the multifunctional peripheral 100. Hereinafter, the front side of the paper surface on which FIG. 2 is drawn will be referred to as the front side of the multifunctional peripheral 100, and the right-and-left direction will be described with reference to the direction in which the multifunctional peripheral 100 is viewed from the front side. In each drawing, U, Lo, L, R, Fr, and Rr indicates an upper, a lower, a left, a right, a front, and a rear, respectively.

The printer 1 includes a rectangular parallelepiped main body housing 3. In the lower portion of the main body housing 3, a sheet feeding cassette 4 in which a sheet S is stored and a sheet feeding roller 5 which feeds the sheet S from the sheet feeding cassette 4 are provided. Above the sheet feeding cassette 4, an image forming device 6 which forms a toner image in an electrophotographic manner and a fixing device 7 which fixes the toner image to the sheet S are provided. In the upper portion of the main body housing 3, a pair of discharge rollers 8 which discharges the sheet S on which the toner image is fixed and a discharge tray 9 on which the discharged sheet S is stacked are provided.

Inside the main body housing 3, a conveyance path 10 is provided from the sheet feeding roller 5 to the pair of discharge rollers 8 via the image forming device 6 and the fixing device 7. On the conveyance path 10, a plurality of conveying roller pairs 17 which conveys the sheet S is provided. On the upstream side of the image forming device 6 in the conveyance direction, a pair of registration rollers 18 is provided.

Each part of the printer 1 is controlled by a controller 2. Above the printer 1, the scanner 110 is provided. On the front side of the scanner 110, an operation panel 19 is provided. The operation panel 19 includes a display panel, a touch panel provided on the display surface of the display panel and a keypad adjacent to the display panel. The controller 2 displays screens showing operation menus of the printer 1 and the scanner 110 on the display panel, and controls respective parts of the printer 1 and the scanner 110 according to the operation detected by the touch panel and the keypad.

Next, an outline of an image forming operation of the printer 1 will be described. When a printing job is input to the printer 1 from an external computer or the like, the sheet feeding roller 5 feeds the sheet S from the sheet feeding cassette 4 to the conveyance path 10, the registration rollers pair 18 whose rotation is stopped corrects a skew of the sheet S, and the registration roller pair 18 feeds the sheet S to the image forming device 6 at a predetermined timing. The image forming device 6 forms the toner image corresponding to the printing job and transfers it to the sheet S. Subsequently, the fixing device 7 fixes the toner image to the sheet S, and the pair of discharge rollers 8 discharges the sheet S to the discharge tray 9. A cleaning device 16 removes the toner remaining on a photosensitive drum 11.

Figure 3:
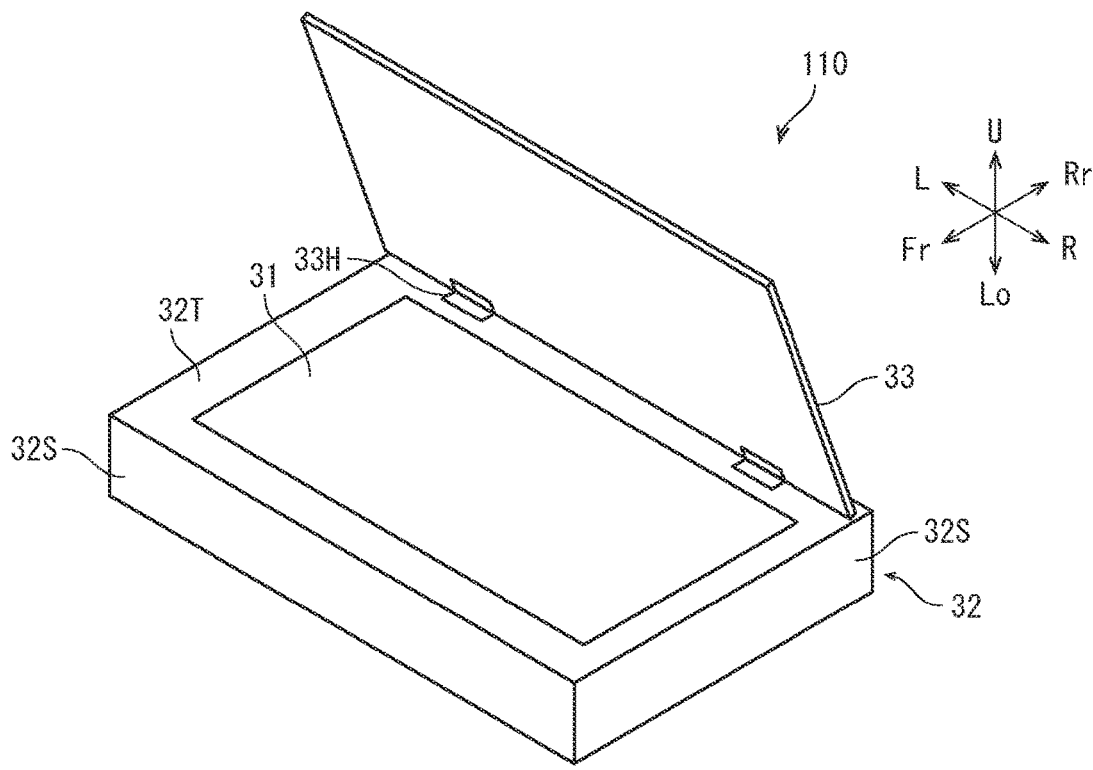
FIG. 3 is a perspective view showing a scanner according to the embodiment of the present disclosure.
Figure 4:
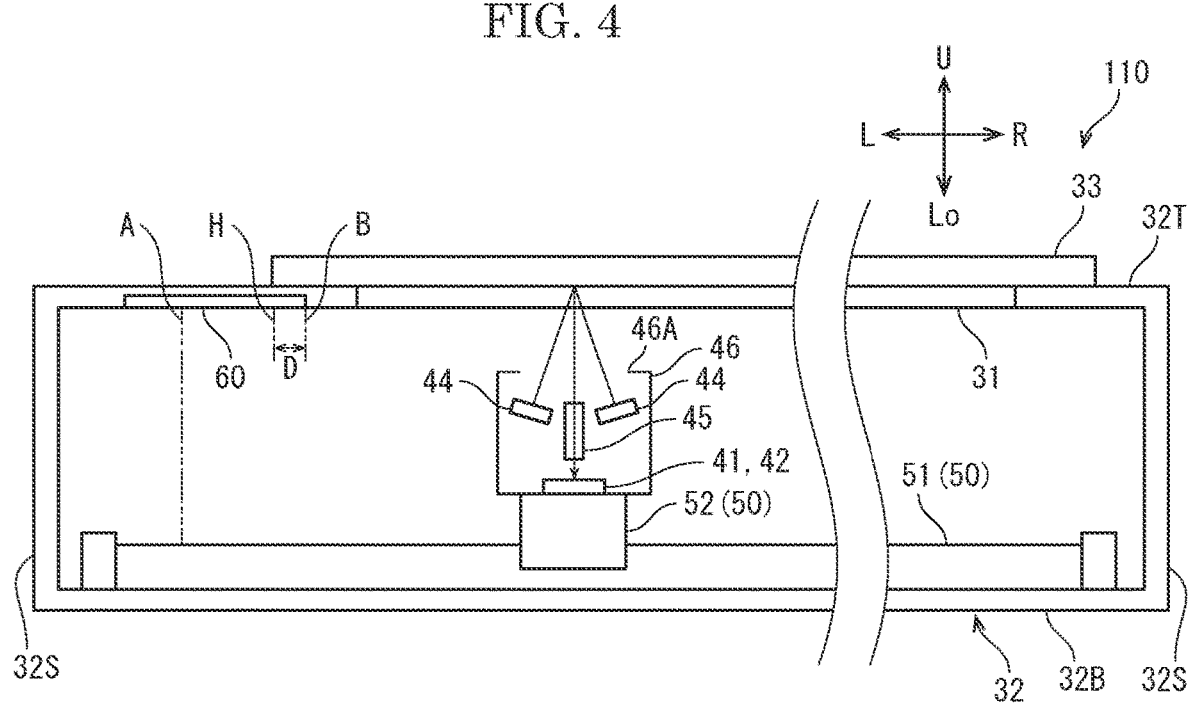
FIG. 4 is a front view schematically showing an inner structure of the scanner according to the embodiment of the present disclosure.
Figure 5:
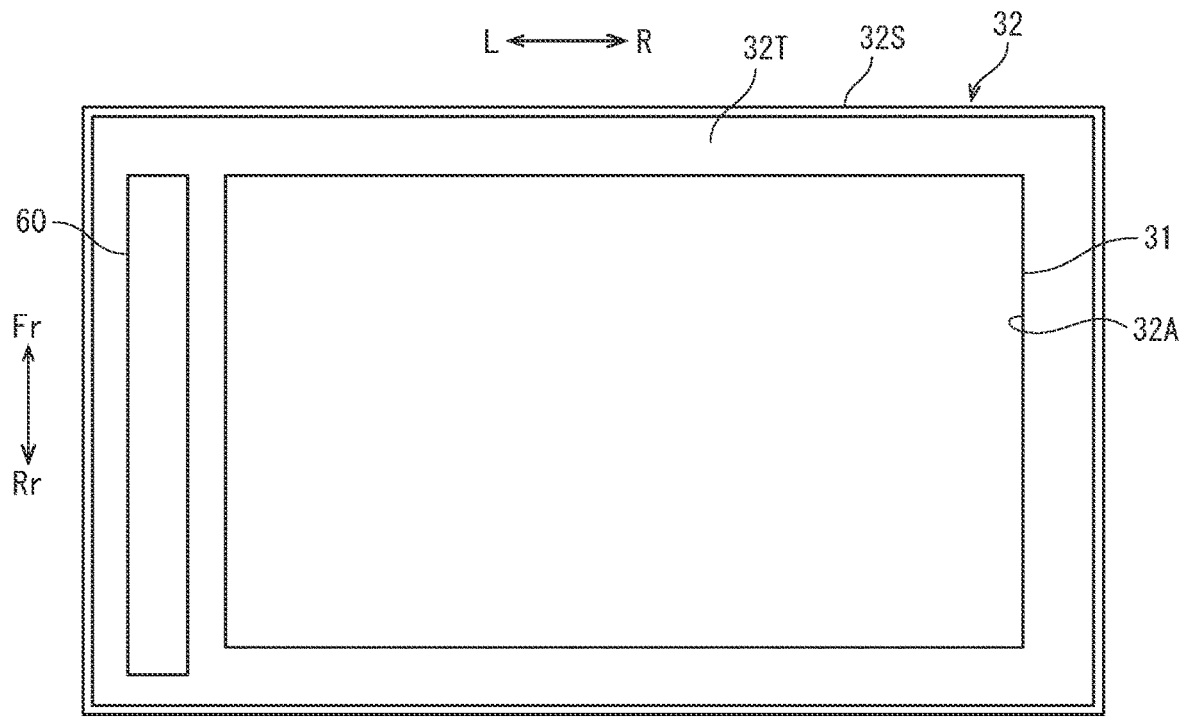
FIG. 5 is a plan view showing a lower surface of a top plate of the scanner according to the embodiment of the present disclosure.
Figure 6:
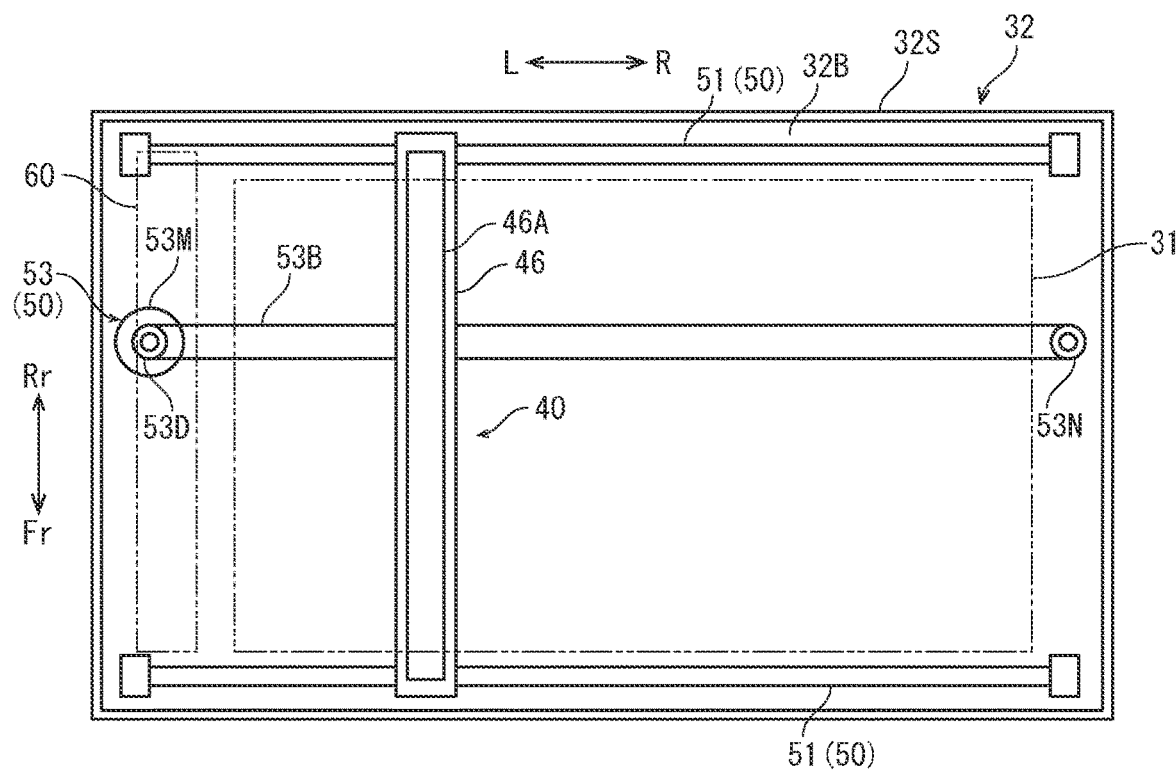
FIG. 6 is a plan view schematically showing the inner structure of the scanner according to the embodiment of the present disclosure.
Figure 7:
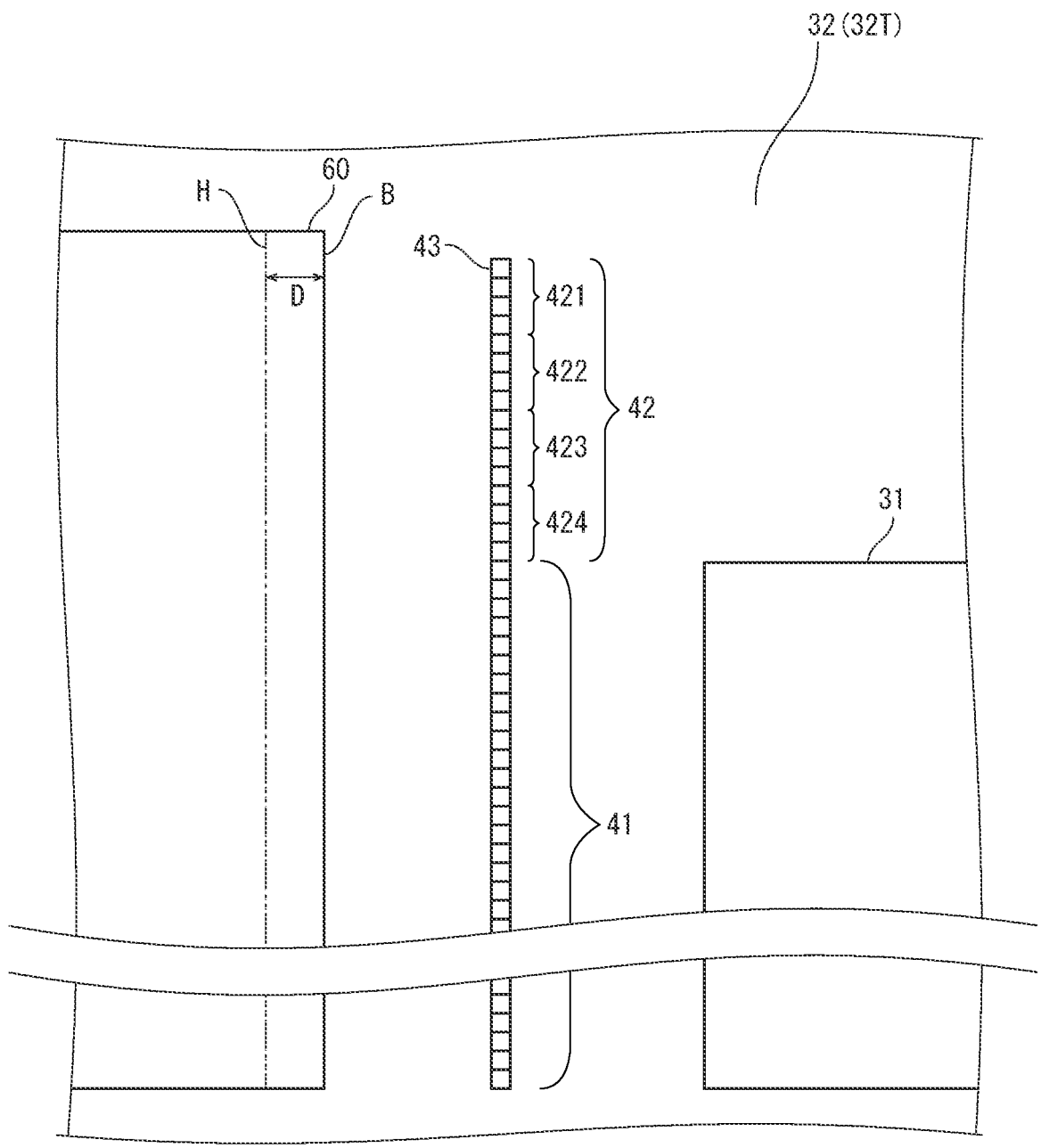
FIG. 7 is a plane view showing a positional relationship of a reference member, a first reading part, a second reading part and a document table according to the embodiment of the present disclosure.
Figure 7:
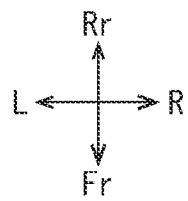
Figure 8:
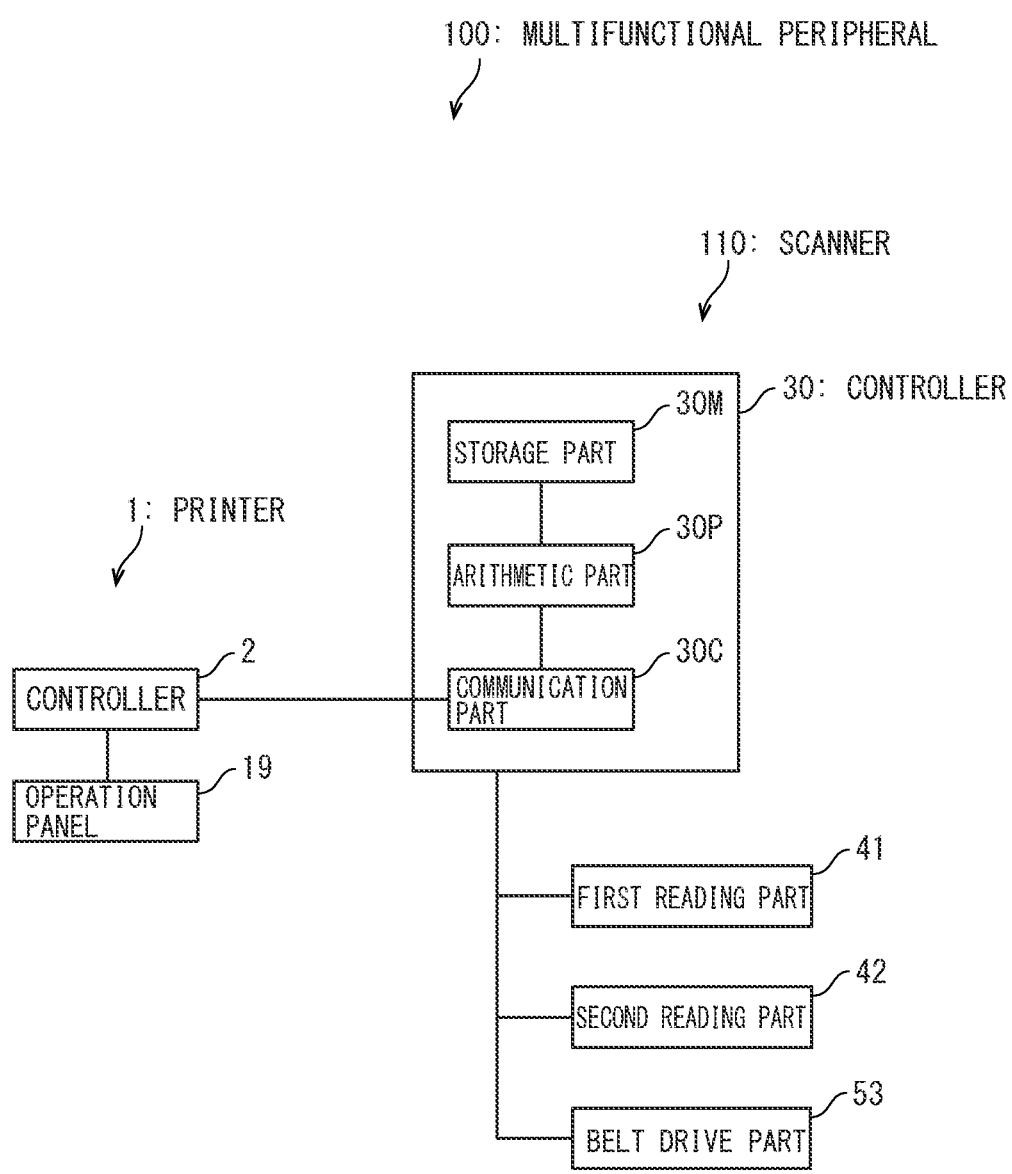
FIG. 8 is a block diagram showing an electrical structure of the scanner according to the embodiment of the present disclosure.

Next, a structure of the scanner 110 will be described. FIG. 3 is a perspective view showing the scanner 110. FIG. 4 is a front view schematically showing an inner structure of the scanner 110. FIG. 5 is a plan view showing a lower surface of a top plate 32T of the scanner 110. FIG. 6 is a plan view schematically showing the inner structure of the scanner 110. FIG. 7 is a plan view showing a positional relationship of a reference member 60, a first reading part 41, a second reading part 42 and a document table 31. FIG. 8 is a block diagram showing an electrical structure of the scanner 110.

The scanner includes a document table 31, a frame 32, a reading unit 40, a moving mechanism 50, a white reference member 60, and a controller 30. The document table 31 is transparent, and on which a document is placed. The frame 32 is provided along the peripheral edge of the document table 31. The reading unit 40 reads the document in a main scanning direction. The moving mechanism 50 moves the reading unit 40 in a sub scanning direction crossing to the main scanning direction. The reference member 60 is provided on the frame 32 adjacent to the document table 31 in the sub scanning direction, and has a length in the main scanning direction longer than that of the document table 31. The controller 30 controls the moving mechanism 50. The reading unit 40 includes the first reading part 41 which reads a region corresponding to the document table 31 and the second reading part 42 which reads a region corresponding to the frame 32. The controller 30 detects a boundary B between the frame 32 and the reference member 60 based on a read value of the second reading part 42 while the moving mechanism 50 moves the reading unit 40, and then positions the reading unit 40 at a home position H apart from the boundary B by the predetermined distance D. In the present embodiment, the main scanning direction is the front-and-rear direction, and the sub scanning direction is the left-and-right direction.

[Document Table] The document table 31 (see FIG. 3 to FIG. 6) is formed by a rectangular plate glass slightly larger than a A4 size sheet S. The longer side of the document table 31 is parallel to the sub scanning direction and the shorter side of the document table 31 is parallel to the main scanning direction.

[Frame] The frame 32 is formed into an approximately parallelepiped box-like shape, and has a rectangular bottom plate 32B, a rectangular top plate 32T and a side plate 32S provided between the four side edges of the bottom plate 32B and the four side edges of the top plate 32T. The top plate 32T has an opening 32A having a size corresponding to the document table 31. Above the top plate 32T, a holding plate 33 slightly larger than the opening 32A is provided. The holding plate 33 is openable and closable around a hinge 33H provided on the rear side of the opening 32A. The inner surface of the frame 32 may have the black color or a dark color near the black color, and be made of material having little reflection.

[Reading Unit] The reading unit 40 (see FIG. 4, FIG. 7) is a CIS (Contact Image Sensor), and includes a light source 44, a lens 45, the first reading part 41, the second reading part 42, and a housing 46. The light source 44 is, for example, a sidelight system including an LED (Light Emitting Diode) provided at the end portion in the main scanning direction, and a light guide for guiding the light of the LED to the document. The lens 45 is, for example, a rod lens array having a plurality of rod lenses arranged in the main scanning direction. The first reading part 41 and the second reading part 42 are each an image sensor array including a plurality of photoelectric conversion elements 43 arranged in the main scanning direction. The photoelectric conversion element 43 is, for example, a CMOS (Complementary Metal-Oxide-Semiconductor field-effect transistor) image sensor.

The housing 46 houses the light source 44, the lens 45, the first reading part 41, and the second reading part 42. The housing 46 is formed into an approximately parallelepiped box-like shape whose longitudinal direction is along the main scanning direction, and has a rectangular opening 46A whose longitudinal direction is along the main scanning direction at the upper portion. The first reading part 41 and the second reading part 42 are provided on the bottom of the housing 46. The first reading part 41 is provided in a range corresponding to the document table 31, and the second reading part 42 is provided in a range corresponding to the top plate 31T on the rear side of the document table 32. The lens 45 is provided above the first reading part 41 and the second reading part 42, and the light source 44 is provided on the left and right sides of the lens 45 or on either the right side or the left side of the lens 45.

Below the document table 31, the light emitted from the light source 44 is reflected by the document placed on the document table 31 or the holding plate 33. The reflected light is condensed by the lens 45 and is incident on the first reading part 41. Below the top plate 32T on the rear side of the document table 31, the light emitted from the light source 44 is reflected by the top plate 31T. The reflected light is condensed by the lens 45 and is incident on the second reading part 42. The first reading part 41 and the second reading part 42 each transmits an electric signal generated by converting the reflected light into electric charge to the controller 30.

[Moving Mechanism] The moving mechanism 50 (see FIG. 4 and FIG. 6) includes rails 51, sliders 52, a belt driving part 53. The rails 51 are provided on the upper surface of the bottom plate 32B along the main scanning direction. The sliders 52 are provided on the bottom of the housing 46 of the reading unit 40. The slider 52 has, for example, a shape saddling the rail 51, and can be slid along the rail 51. At the left end portion of the rails 51, the sliders 52 are prevented from being moved leftward so that the reading unit 40 does not depart from the reference member 60 leftward. The belt driving part 53 includes a motor 53M provided at one end portion of the bottom plate 32B in the sub scanning direction, a driving pulley 53D provided on the shaft of the motor 53M, a driven pulley 53N provided at the other end portion of the bottom plate 32B in the sub scanning direction, and a belt 53B wound around the driving pulley 53D and the driven pulley 53N. The housing 46 is connected to the belt 53B. Instead of the belt driving part 53, a rack and pinion, a ball screw, a linear motor, or the like may be used.

[Reference Member] The reference member 60 (see FIG. 4 to FIG. 7) is a rectangular plate whose longitudinal direction is along the main scanning direction, is made of resin, metal, or synthetic paper, and has the white lower surface. The reference member 60 is provided on the lower surface of the top plate 32T on the left side of the document table 31. The length of the reference member 60 in the main scanning direction is longer than the length of the shorter side edge of the document table 31, and the rear end portion of the reference member 60 is positioned on the rear side of the rear end portion of the second reading part 42.

[Controller] Each part of the scanner 110 is controlled by the controller 30 (see FIG. 8). The controller 30 includes an arithmetic part 30P, a storage part 30M, and a communication part 30C. The arithmetic part 30P is, for example, a CPU (Central Processing Unit). The storage part 30M includes storage media such as ROM (Read Only Memory), RAM (Random Access Memory), and EEPROM (Electrically Erasable Programmable Read Only Memory). The arithmetic part 30P reads and executes the control program stored in the storage part 30M to execute various processes. The communication part 30C is a communication interface connected to the controller 2 of the printer 1 via a signal line, and communicates with the printer 1. The controller 30 may be achieved by an integrated circuit that does not use software.

For example, assume that the printer 1 forms the image using monochrome image data of 256 gradations (0 to 255, 0 is black, 255 is white). The controller 30 corrects the read value of each photoelectric conversion element 43 of the first reading part 41 by converting the read value indicated by the electric signal received by the first reading part 41 when the first reading part 41 reads the reference member 60 to the maximum value of the 256 gradations. Further, the controller 30 creates the image data by converting the read value indicated by the electric signal received by the first reading part 41 when the first reading part 41 reads the document, and then transmits it to the printer 1.

Further, when the power is supplied, the controller 30 determines which of the frame 32 and the reference member 60 the reading unit 40 faces using the read value of the second reading part 42. Specifically, a threshold for determination is set between the read value of the frame 32 and the read value of the reference member 60. If the read value is less than the threshold, the controller 30 determines that the reading unit 40 faces the frame 32. On the other hand, when the read value is more than the threshold, the controller 30 determines that the reading unit 40 faces the reference member 60.

If the determination may be made by one photoelectric conversion element 43, in a case where a white foreign substance FW is attached on the frame 32, even if the reading unit 40 actually faces the frame 32, the controller 30 may erroneously determine that the reading unit 40 faces the reference member 60. On the other hand, in a case where a black foreign substance FB is attached on the reference member 60, even if the reading unit 40 actually faces the reference member 60, the controller 30 erroneously determines that the reading unit 40 faces the frame 32.

Therefore, in the present embodiment, the determination is made using the plurality of photoelectric conversion elements 43 arranged in the main scanning direction. Specifically, the second reading part 42 includes the plurality (in this example, 16) of photoelectric conversion elements 43 (see FIG. 7). The controller 30 divides the plurality of photoelectric conversion elements 43 of the second reading part 42 into a plurality of sets including a plurality of the adjacent photoelectric conversion elements (in this example, four sets, each set including four photoelectric conversion elements (the first set 421, the second set 422, the third set 423 and the fourth set 424)), obtains the average value of the read values for each set, and makes the determination by using the minimum value of the average values for each set. The reason of obtaining the average value for each set is to reduce the influence of variations in the read values due to electric noise. The number of photoelectric conversion elements 43 of each set is set so as to be capable of reading a region wider than the size of the assumed black foreign substance FB. In the present embodiment, as the size of the black foreign substance FB, a size corresponding to the maximum of three photoelectric conversion elements 43 is assumed. The size of the white foreign substance FW is assumed to be larger than that of the black foreign substance FB.

Next, the operation of the scanner 110 will be described. In the present embodiment, when the power is supplied, the reading unit 40 is positioned at the home position H. The home position H is set on the side of the reference member 60, and when the reading unit 40 is positioned at the home position H, the first reading part 41 and the second reading part 42 face the reference member 60. Conventionally, when the power is supplied, the reading unit 40 is stopped at the home position H (see FIG. 4, FIG. 7), however, in some cases, the reading unit 40 may be stopped at a position other than the home position H. A case where the reading unit 40 is stopped at a position other than the home position H may contain a case where the voltage of the power source is dropped during execution of the reading job, a case before the power is supplied after assembling at the factory, and a case where the reading unit 40 is shifted from the home position H due to vibration during transportation.

Figure 9:
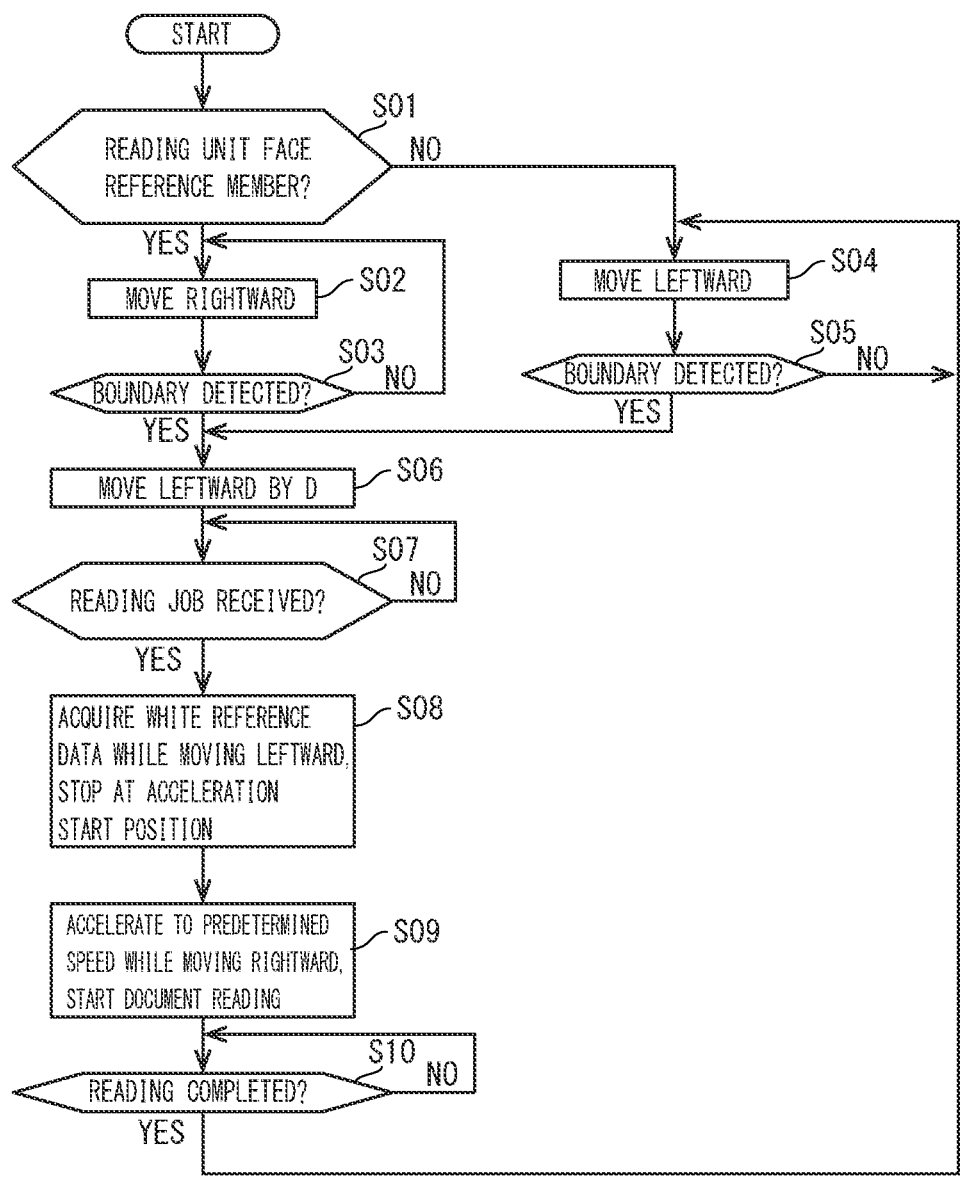
FIG. 9 is a flow diagram showing an operation of the scanner according to the embodiment of the present disclosure.

FIG. 9 is a flow diagram showing the operation of the scanner 110. When the scanner 110 is powered on, the controller 30 executes process according to the flow diagram shown in FIG. 9. Hereinafter, the minimum value of the average values of the read values for the four sets each including four photoelectric conversion elements 43 is referred to as the minimum average value.

First, the controller 30 determines whether the reading unit 40 faces the reference member 60 (step S01). Specifically, in a case where the minimum average value is more than the threshold (for example, 30), the controller 30 determines that the reading unit 40 faces the reference member 60 (YES: step S01), moves the reading unit 40 rightward by a minuet distance (step S02), and then determines whether the boundary B between the frame 32 and the reference member 60 is detected (step S03). In a case where the minimum average value is still more than the threshold, the controller 30 determines that the boundary B is not detected, and repeats the processes after step S02. On the other hand, in a case where the minimum average value is changed to a value less than the threshold, the controller 30 determines that the boundary B is detected (step S03: YES), and shifts the process to step S06.

On the other hand, in a case where the read value is less than the threshold in step S01, the controller 30 determines that the reading unit 40 does not face the reference member 60 (faces the frame 32) (step S01: NO), moves the reading unit 40 leftward by a minuet distance (step S04), and then determines whether the boundary B between the frame 32 and the reference member 60 is detected (step S05). In a case where the minimum average value is still less than the threshold, the controller 30 determines that the boundary B is not detected (step S05: NO), and repeats the processes after step S04. On the other hand, in a case where the minimum average value is changed from a value less than the threshold to a value more than the threshold, the controller 30 determines that the boundary B is detected (step S05: YES), and shifts the process to step S06.

In step S06, the controller 30 moves the reading unit 40 leftward by the predetermined distance D. The predetermined distance D is a distance between the boundary B between the frame 32 and the reference member 60 and the home position H, and is a known value. In the above process, the reading unit 40 is positioned at the home position H. At the home position H, the first reading part 41 and the second reading part 42 face the reference member 60.

Next, the controller 30 determines whether a reading job is received (step S07). Specifically, when the operation for reading is performed on the operation panel 19, the controller 2 of the printer 1 transmits the reading job showing the content of the operation to the controller 30. If the controller 30 determines that the reading job is not received (step S07: NO), it repeats the process in step S7. If the controller 30 determines that the reading job is received (step S07: YES), it shifts the process to step S08.

In step S08, the controller 30 reads the reference member 60 while moving the reading unit 40 leftward to acquire a white reference data, and then stops the reading unit 40 at an acceleration start position A (see FIG. 4) (step S08). Next, the controller 30 accelerates the reading unit 40 to the predetermined speed while moving it rightward, and when the reading unit 40 is moved to the left end portion of the document table 31, it makes the reading unit 40 start the reading of the document (step S09). The controller 30 makes the reading unit 40 read the document while moving the reading unit 40 rightward with keeping the predetermined speed to create an image data. When the image data is created, the controller 30 corrects the image data based on the white reference data. The controller 30 estimates a size of the document in parallel with the creating of the image data, and determines whether the document is read to the right end portion thereof (whether the reading of the document is completed) (step S10). If the controller 30 determines that the reading of the document is not completed (step S10: NO), it repeats the process in step S10. If the controller 30 determines that the reading of the document is completed (step S10: YES), it shifts the process to step S04. In the above processes, the reading unit 40 is positioned at the home position H again.

Here, a determination example is shown in a case where it is assumed that the read values of 16 photoelectric conversion elements 43 do not vary and the inner surface of the frame 32 is black.

Figure 10:
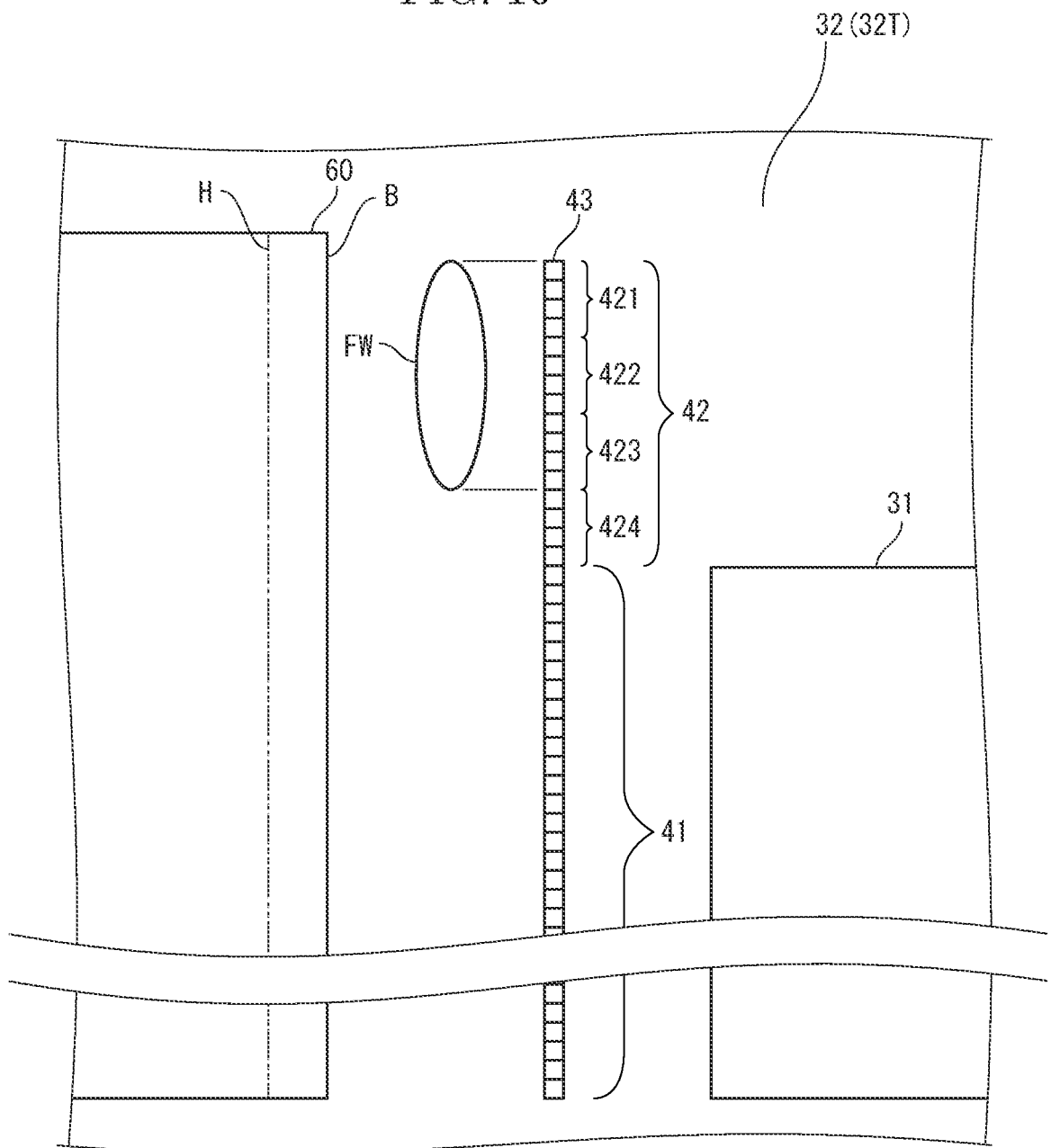
FIG. 10 is a view showing an example where a white foreign substance is attached to the top plate.
Figure 10:
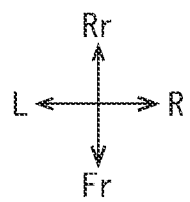

FIG. 10 shows an example in which a white foreign substance FW is attached on the top plate 32T. In this example, the white foreign substance FW having a size (in a case of 300 dpi (dots per inch), approximately 1.0 mm) corresponding to 12 photoelectric conversion elements 43 is attached on an area corresponding to the first set 421 to the third set 423 on the top plate 32T. In this example, the reading unit 40 is stopped on the right side of the foreign substance FW due to the above-described voltage drop or the like. In this case, since the average values of the read values of the first set 421 to the fourth set 424 are all zero, the minimum average value is also zero. When the threshold is 30, since the minimum average value is less than the threshold, the controller 30 determines that the reading unit 40 does not face the reference member 60 (step S01: NO), and executes the processes of step S04 and step S05.

Before the reading unit 40 reaches the area of the foreign substance FW, since the average values of the read values of the first set 421 to the fourth set 424 are all zero, the minimum average value is also zero. Since the minimum average value is still less than the threshold, the controller 30 determines that the reading unit 40 does not detect the boundary B (step S05: NO), and repeats the processes of step S04 and step S05.

When the reading unit 40 reaches the area of the foreign substance FW, although the average values of the first set 421 to the third set 423 are all 255, the average value of the fourth set 424 is zero, so that the minimum average value is also zero. Since the minimum average value is still less than the threshold, the controller 30 determines that the reading unit 40 does not detect the boundary B (step S05: NO), and repeats the processes of step S04 and step S05.

When the reading unit 40 passes the area of the foreign substance FW, since the average values of the read values of the first set 421 to the fourth set 424 are all zero, the minimum average value is also zero. Since the minimum average value is still less than the threshold, the controller 30 determines that the reading unit 40 does not detect the boundary B (step S05: NO), and repeats the processes of step S04 and step S05.

When the reading unit 40 reaches the boundary B, since the average values of the read values of the first set 421 to the fourth set 424 all change from 0 to 255, the minimum average value also changes from 0 to 255. Since the minimum average value is changed from less than the threshold to more than the threshold, the controller 30 determines that the reading unit 40 detects the boundary B (step S05: YES), and shifts the process to step S06.

Figure 11:
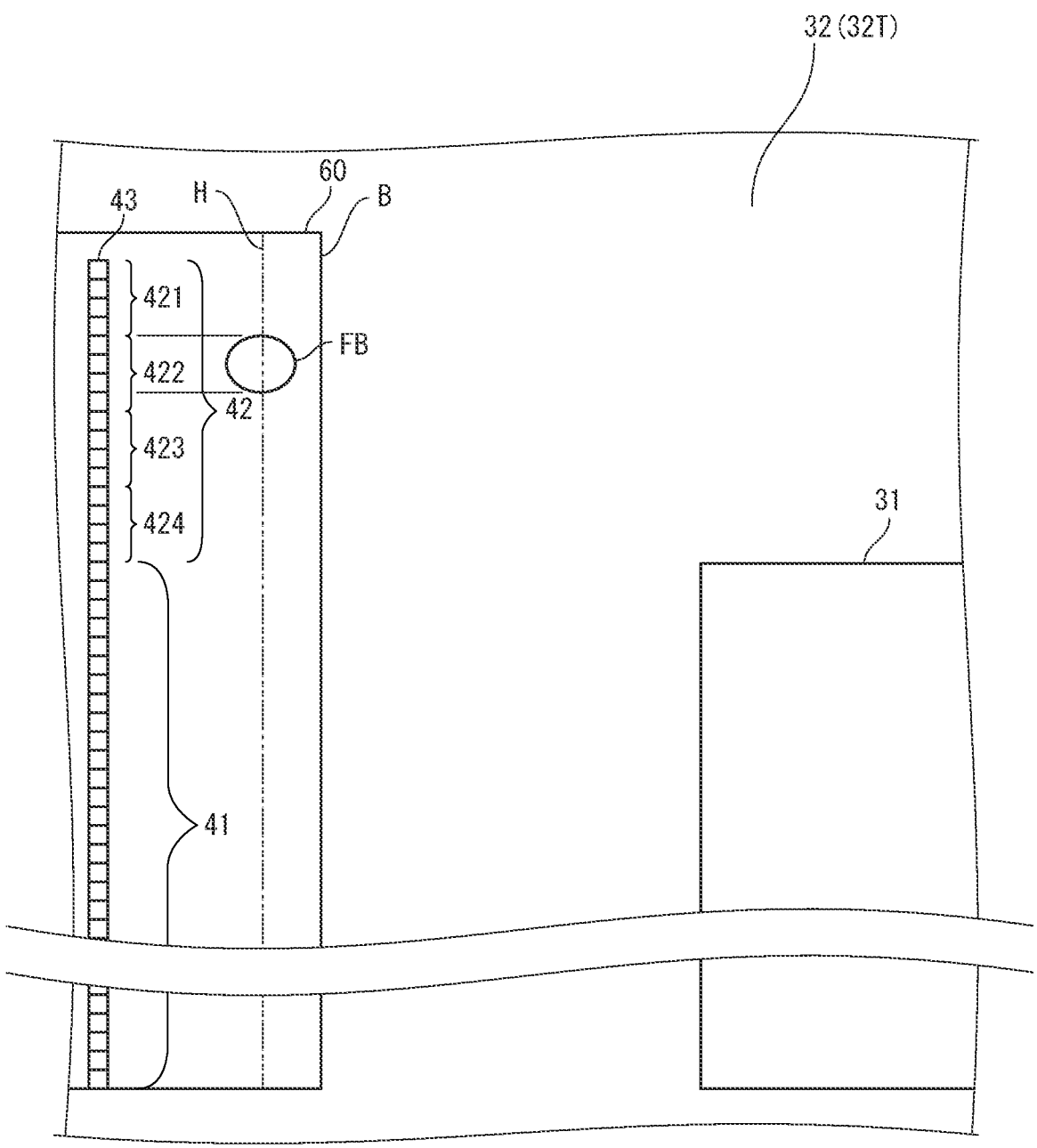
FIG. 11 is a view showing an example where a black foreign substance is attached to the top plate.
Figure 11:
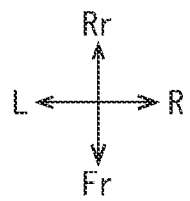

On the other hand, FIG. 11 shows an example in which a black foreign substance FB is attached on the reference member 60. In this example, the black foreign substance FB having a size (in a case of 300 dpi, about 0.25 mm) corresponding to three photoelectric conversion elements 43 is attached on an area corresponding to the second set 422 on the reference member 60. In this example, the reading unit 40 is stopped at a position on the left side of the foreign substance FB due to the above-described voltage drop or the like. In this case, since the average values of the read values of the first set 421 to the fourth set 424 are all 255, the minimum average value is also 255. Since the minimum average value is more than the threshold, the controller 30 determines that the reading unit 40 faces the reference member 60 (step S01: YES), and executes the processes of step S02 and step S03.

Before the reading unit 40 reaches the area of the foreign substance FB, since the average values of the read values of the first set 421 to the fourth sets 424 are all 255, the minimum average value is also 255. Since the minimum average value is still more than the threshold, the controller 40 determines that the reading unit 40 does not detect the boundary B (step S03: NO), and repeats the processes of step S02 and step S03.

When the reading unit 40 reaches the area of the foreign substance FB, although the average values of the first set 421, the third set 423, and the fourth set 424 are all 255, the average value of the second set 422 is 255×1÷4=63.75, so that the minimum average value is 63.75. By setting the threshold between 0 and 63.75, it becomes possible to prevent erroneous determination of the black foreign substance FB having a maximum size corresponding to 3 photoelectric conversion elements. Therefore, in this embodiment, as an example, the threshold is set to 30. Since the minimum average value is still more than the threshold, the controller 30 determines that the reading unit 40 does not detect the boundary B (step S03: NO), and repeats the processes of step S02 and step S03.

When the reading unit 40 passes the area of the foreign substance FB, since the average values of the read values of the first set 421 to the fourth set 424 are all 255, the minimum average value is also 255. Since the minimum average value is still more than the threshold, the controller 30 determines that the reading unit 40 does not detect the boundary B (step S03: NO), and repeats the processes of step S02 and step S03.

When the reading unit 40 reaches the boundary B, since the average values of the read values of the first set 421 to the fourth set 424 all change from 255 to 0, the minimum average value also changes from 255 to 0. Since the minimum average value is changed from less than the threshold to more than the threshold, the controller 30 determines that the reading unit 40 detests the boundary B (step S03: YES), and shifts the process to step S06.

According to the scanner 110 of the embodiment described above, the reading unit 40 includes the first reading part 41 which reads an area corresponding to the document table 31 and the second reading part 42 which reads an area corresponding to the frame 32, and the controller 30 detects the boundary B between the frame 32 and the reference member 60 based on the read value of the second reading unit 42 while moving the reading unit 40 by the moving mechanism 50, and positions the reading unit 40 at the home position H apart from the boundary B by the predetermined distance D, so that the reading unit 40 can be positioned at the home position H in a short time with a simple configuration.

According to the scanner 110 according to the present embodiment, the home position H is set on the side of the reference member 60, and the controller 30 detects the boundary B while moving the second reading unit 42 toward the reference member 60 when the read value of the second reading part 42 indicates that the reading unit 40 is stopped at a position where the second reading unit 40 faces the frame 32, and detects the boundary B while moving the reading unit 40 toward the frame 32 when the read value of the second reading part 42 indicates that the reading unit 40 is stopped at a position where the second reading part 42 faces the reference member 60, so that it becomes possible to detect the boundary B in a short time.

According to the scanner 110 according to the present embodiment, the second reading part 42 includes the plurality of photoelectric conversion elements 43 arranged in the main scanning direction, and the controller 30 detects the boundary B using the minimum value of the read values of the plurality of photoelectric conversion elements 43, so that erroneous detection due to adhesion of foreign substance can be prevented.

Further, according to the scanner 110 according to the present embodiment, the controller 30 detects the boundary B by using the minimum value of the average value of the read values of the sets including the plurality of photoelectric conversion elements 43, so that the influence of variations in the read values due to electric noise can be reduced.

Further, according to the scanner 110 according to the present embodiment, since the set of the plurality of photoelectric conversion elements 43 can read a wider area than an assumed foreign substance, it is possible to prevent erroneous detection due to adhesion of the foreign substance.

The above embodiment may be modified as follows.

Although the above embodiment shows an example in which the boundary B is detected by using the minimum value (the minimum average value) of the average values of the read values of the sets of the plurality of photoelectric conversion elements 43, the boundary B may be detected by using the minimum value of the read values of the plurality of photoelectric conversion elements 43 of the second reading part 42.

Although the above embodiment shows an example in which the detection of the boundary B is performed using the minimum value of the average values of the read values for the sets of the plurality of photoelectric conversion elements 43, the detection of the boundary B may be performed using the maximum value of the average values of the read values of the sets of the plurality of photoelectric conversion elements 43. In this configuration, when the white foreign substance FW having a size corresponding to three photoelectric conversion elements 43 is attached to a position corresponding to the second set 422 on the top plate 32T, the average values of the first set 421, the third set 423, and the fourth set 424 are all 0, but the average value of the second set 422 is 255×3÷4=191.25, so that the maximum value of the average values of the read values for the sets is 191.25. Therefore, by setting the threshold between 191.25 and 255 (for example, 230), it becomes possible to prevent erroneous determination of the foreign substance FW.

The above embodiment shows an example where the home position H is set on the side of the reference member 60, but the home position H may be set on the side of the frame 32.

The above embodiment shows an example where the reading unit 40 is a CIS, but the present disclosure may be adopted for a scanner using an optical reduction system.

The invention claimed is:

1. An image reading device comprising:
a transparent document table on which a document is placed;

a frame provided around a peripheral of the document table;

a reading unit which reads the document in a main scanning direction;

a moving mechanism which moves the reading unit in a sub scanning direction crossing to the main scanning direction;

a white reference member provided on the frame adjacent to the document table in the sub scanning direction and having a length in the main scanning direction longer than the document table; and a controller which controls the moving mechanism, wherein the reading unit includes a first reading part which reads an area corresponding to the document table and a second reading part which reads an area corresponding to the frame, and the controller detects a boundary between the frame and the reference member based on a read value of the second reading part while moving the reading unit by the moving mechanism, and positions the reading unit at a home position apart from the boundary by a predetermined distance.

2. The image reading device according to claim 1, wherein the home position is set on a side of the reference member, the controller detects the boundary while moving the reading unit toward the reference member when the reading unit is stopped at a position where the second reading part faces the frame, and detects the boundary while moving the reading unit toward the frame when the reading unit is stopped at a position where the second reading part faces the reference member.

3. The image reading device according to claim 2, wherein the second reading part includes a plurality of photoelectric conversion elements arranged in the main scanning direction, and the controller detects the boundary by using a minimum value of read values of the plurality of photoelectric conversion elements.

4. The image reading device according to claim 3, wherein the photoelectric conversion elements are divided into a plurality of sets including a predetermined number of the photoelectric conversion elements, and the controller detects the boundary by using a minimum value of average values of read values of the sets.

5. The image reading device according to claim 4, wherein the set of photoelectric conversion elements has a width capable of reading a range wider than a width of an assumed foreign substance.

6. The image forming device according to claim 1, wherein an inner surface of the frame has a black color or a dark color near the black color.

7. The image reading device according to claim 1, wherein the controller moves the reading unit to an acceleration start position apart from the home position in an opposite direction to the document table, and then accelerates the reading unit at a predetermined speed to move the reading unit to the document table.

8. An image forming system comprising:

the image reading device according to claim 1; and an image forming apparatus which forms an image of the document read by the image reading device on a sheet.

* * * * *